(12) United States Patent
Fornasier et al.

(10) Patent No.: US 8,801,265 B2
(45) Date of Patent: Aug. 12, 2014

(54) MACHINE AND METHOD FOR HOMOGENIZING A BITUMEN-BASED MIXTURE WITH POLYMER GRANULES

(75) Inventors: Antonio Fornasier, San Biagio di Callalta (IT); Alessandro Pavan, Lanzago di Silea (IT)

(73) Assignee: Euroline S.r.l., Maserada sul Piave (IT)

( * ) Notice: Subject to any disclaimer, the term of this patent is extended or adjusted under 35 U.S.C. 154(b) by 1395 days.

(21) Appl. No.: 12/526,483

(22) PCT Filed: Feb. 8, 2008

(86) PCT No.: PCT/IB2008/000277
§ 371 (c)(1),
(2), (4) Date: Mar. 18, 2010

(87) PCT Pub. No.: WO2008/096248
PCT Pub. Date: Aug. 14, 2008

(65) Prior Publication Data
US 2010/0190893 A1 Jul. 29, 2010

(30) Foreign Application Priority Data
Feb. 9, 2007 (IT) .............................. TO2007A0098

(51) Int. Cl.
*B01F 7/16* (2006.01)
*B01F 7/00* (2006.01)

(52) U.S. Cl.
USPC ................ 366/65; 366/67; 366/309; 366/312

(58) Field of Classification Search
CPC ......... B01D 21/00; B01D 21/28; B01D 21/24
USPC ............. 366/52, 56, 221, 224, 225, 226, 290, 366/309, 312, 64, 67, 65
See application file for complete search history.

(56) References Cited

U.S. PATENT DOCUMENTS

| | | | | |
|---|---|---|---|---|
| 4,931,180 A | * | 6/1990 | Darchambeau | 210/414 |
| 6,234,415 B1 | * | 5/2001 | Liin | 241/46.11 |

FOREIGN PATENT DOCUMENTS

| | | | | |
|---|---|---|---|---|
| CN | 202526994 | * | 11/2012 | ............ B01D 35/02 |
| FR | 2679789 | | 7/1991 | |
| JP | 62068893 | | 3/1987 | |
| WO | WO 2008096248 A1 | * | 8/2008 | .............. C08L 95/00 |

OTHER PUBLICATIONS

PCT International Search Report dated Jul. 15, 2008 for PCT/IB2008/000277.

* cited by examiner

*Primary Examiner* — Tony G Soohoo
(74) *Attorney, Agent, or Firm* — Foley & Lardner LLP

(57) ABSTRACT

There is described a machine for homogenizing a bitumen-based mixture with polymer granules. The machine includes an outer container and a cylindrical sleeve, which is housed within the outer container and is provided with a perforated side wall, on which a plurality of through apertures is obtained, each of the holes comprising a sharp cutting edge. The machine further includes a homogenizer assembly, which is mounted so as to axially rotate within the sleeve in order to rotate about a vertical axis, and is configured so as to displace, during its rotation, at least part of the bitumen-based mixture and the polymer granules along a direction which is substantially tangential to the inner surface of the perforated side wall of the sleeve so as to induce the polymer granules to impact against the sharp cutting edge of the through apertures.

16 Claims, 5 Drawing Sheets

MACHINE AND METHOD FOR HOMOGENIZING A BITUMEN-BASED MIXTURE WITH POLYMER GRANULES

CROSS-REFERENCE TO RELATED PATENT APPLICATIONS

Italy Priority Application TO2007A 000098, filed Feb. 9, 2007 including the specification, drawings, claims and abstract, is incorporated herein by reference in its entirety.

TECHNICAL FIELD

The present invention relates to a machine and to a method for homogenizing a bitumen-based mixture with polymer granules.

In greater detail, the present invention relates to a homogenizer machine which is capable of shredding polymer granules in small polymer pieces and, at the same time, of mixing the latter with a bitumen-based mixture, so as to obtain a bituminous blend having elastoplastic properties; the following disclosure will explicitly refer thereto without thereby loosing in generality.

BACKGROUND OF THE INVENTION

Processes are known for homogenizing bitumen-based mixtures (referred to hereinafter as bituminous mixtures) with granules of Styrene-Butadiene-Styrene (SBS)-based polymeric material and/or polyolefins in order to produce bituminous blends adapted to manufacture flexible bituminous insulating films applicable in particular in the construction field to perform a protective and/or insulating function.

The above mentioned homogenizing processes are currently carried out by means of homogenizer machines which substantially include: an outer casing, within which there is obtained a granule shredding chamber, a disc-shaped stator, which is stably arranged within the shredding chamber in a position coaxial to a horizontal axis, and a rotor which also has a disc shape and is mounted so as to freely rotate within the shredding chamber facing the stator and is fitted on an electric motor shaft which is adapted to rotate it about the horizontal axis.

Specifically, the rotor and the disc-shaped stator each consist of a round plate and a plurality of blades, which are attached on opposite surfaces of the round plates themselves and radially extend from the horizontal axis towards the outer edge of the plates so as to define radial channels therebetween, each radial channel having a gradually decreasing width towards the outer periphery of the surfaces themselves.

In use, the bituminous material and the polymer granules are subjected to an initial premixing and, subsequently, are fed within the shredding chamber of the homogenizer machine, within which the shredding and the final mixing thereof occur at the same time.

Specifically, during the rotation of the rotor, the bituminous material and the polymer granules are pushed by the action of the centrifugal force through the radial channels between the knives towards the outer periphery of the stator and rotor, thus being subjected to cuts by the knives and to a stretching at the same time, i.e. a reduction of their thickness following the forced passage and thus following the compression to which they are subjected within the radial channels.

In order to ensure an appropriate shredding of the granules and their complete mixing with the bituminous material, in the above mentioned homogenizer machines the rotor must rotate so as to reach very high peripheral speeds thereof, typically in the range between 20-50 m/s.

Laboratory tests have shown that once these speeds have been reached by the rotor, the bitumen-granule agglomerate within the shredding chamber reaches a high temperature that determines an alteration of the chemical-physical characteristics of the polymer granules, thus leading to a deterioration of the bituminous blend.

Furthermore, in order to reach the above mentioned rotation speeds of the rotor in the above described homogenizer machines, there is required a high power electric motor, typically on the order of 140-160 kW, which has an especially high energy consumption, and accordingly high operation costs, as well as considerably affecting the overall cost of the homogenizer machine.

DISCLOSURE OF THE INVENTION

Therefore, it is the object of the present invention to provide a machine and a method for homogenizing a bituminous mixture with polymer granules which overcomes the above described drawbacks.

According to the present invention, there is provided a machine for homogenizing a bitumen-based mixture with polymer granules according to claim 1 and preferably, though not necessarily, according to any of the claims directly or indirectly dependent from claim 1.

According to the present invention, there is also provided a method for homogenizing a bitumen-based mixture with polymer granules according to claim 18 and preferably, though not necessarily, according to any of the claims directly or indirectly dependent from claim 18.

BRIEF DESCRIPTION OF THE DRAWINGS

The present invention will now be described with reference to the accompanying drawings, which show a non-limitative embodiment thereof, in which.

BEST MODE FOR CARRYING OUT THE INVENTION

Figure 1:
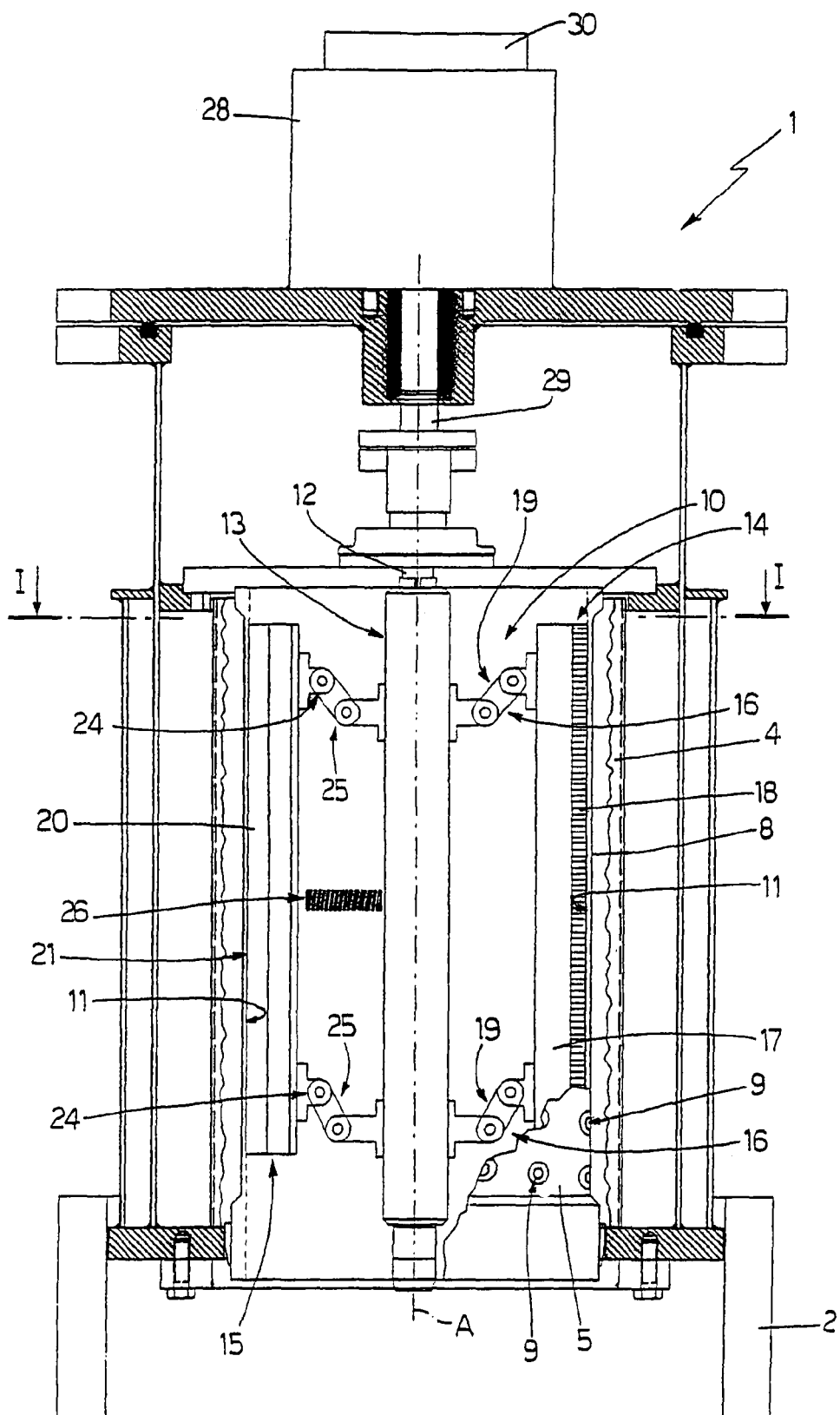
FIG. 1 shows a side view with parts in section and parts removed for clarity of a machine for homogenizing a bitumen-based mixture with polymer granules obtained according to the present invention.

With reference to FIG. 1, numeral 1 shows as a whole a machine for homogenizing a bitumen-based mixture with granules, preferably though not necessarily, of SBS-based polymeric material and/or polyolefins in order to produce bituminous blends adapted to produce flexible insulating films, applicable in the construction field to perform a protective and/or insulating function.

The machine 1 includes: a base bearing structure 2, a collection and heating container 4 for the homogenized bituminous blend, which is supported by the bearing structure 2 so as to be arranged in a position substantially coaxial to a vertical reference axis A; and a sleeve 5, which is arranged within the container 4 preferably, though not necessarily, rested against the bottom wall of the container 4 itself and is adapted to temporarily contain the bituminous mixture and the polymer granules.

Specifically, the collection container 4 is defined by a metal vessel, for instance made of steel or any other type of similar metal, preferably but not necessarily having a cylindrical shape that includes a heating circuit (not shown) within its side wall, which includes a series of heating conduits (not shown), within which a heated fluid flows, for instance, diathermal oil adapted to transfer a determined amount of heat to the inner surface of the side wall of the container 4 so as to maintain the homogenized bituminous blend at a preset temperature.

The container 4 is also connected through an opening (not shown) specifically obtained on its side wall to an exhaust conduit (not shown), through which the homogenized bituminous blend is conveyed outside the container 4 itself.

As far as the sleeve 5 is concerned, it essentially includes a tubular element preferably made of metal, such as for instance steel or any other similar metal, which is stably arranged within the container 4 in a position substantially coaxial to the axis A and has on the side wall 8 a plurality of through apertures 9, each of which is shaped so as to have at least a portion of the sharp cutting edge.

The machine 1 further includes a homogenizer assembly 10, which is mounted so as to axially rotate within the sleeve 5 in order to rotate about the axis A, and is configured so as to displace at least part of the bitumen-based mixture and the polymer granules contained within the sleeve 5 along a direction which is substantially tangential to the inner surface 11 of the perforated side wall 8 so as to induce the polymer granules adhered on the inner surface 11 itself to impact on the sharp cutting edge portions of said apertures 9, thus obtaining the shredding of the polymer granules. Specifically, each portion of the sharp cutting edge is positioned so as to face the polymer granules when the latter are pushed by the homogenizer assembly 10 along the inner surface 11.

The homogenizer assembly 10 is also configured so as to exert, during the displacement of the bituminous material and of the polymer granules along the direction tangential to the inner surface 11 of the perforated side wall 8, a compression of the polymer granules on the inner surface 11 so as to obtain a crushing thereof. In this manner, the polymer granules are subjected to a stretching along the rotation direction of the homogenizer assembly 10 that determines a reduction of the thickness thereof.

During its rotation, the homogenizer assembly 10 is further adapted to mix the polymer granules and the bituminous blend within the containment space of the sleeve 5 and to push a determined amount of mixed bituminous mixture with shredded polymer granules through the apertures 9 towards the container 4.

Figure 2:
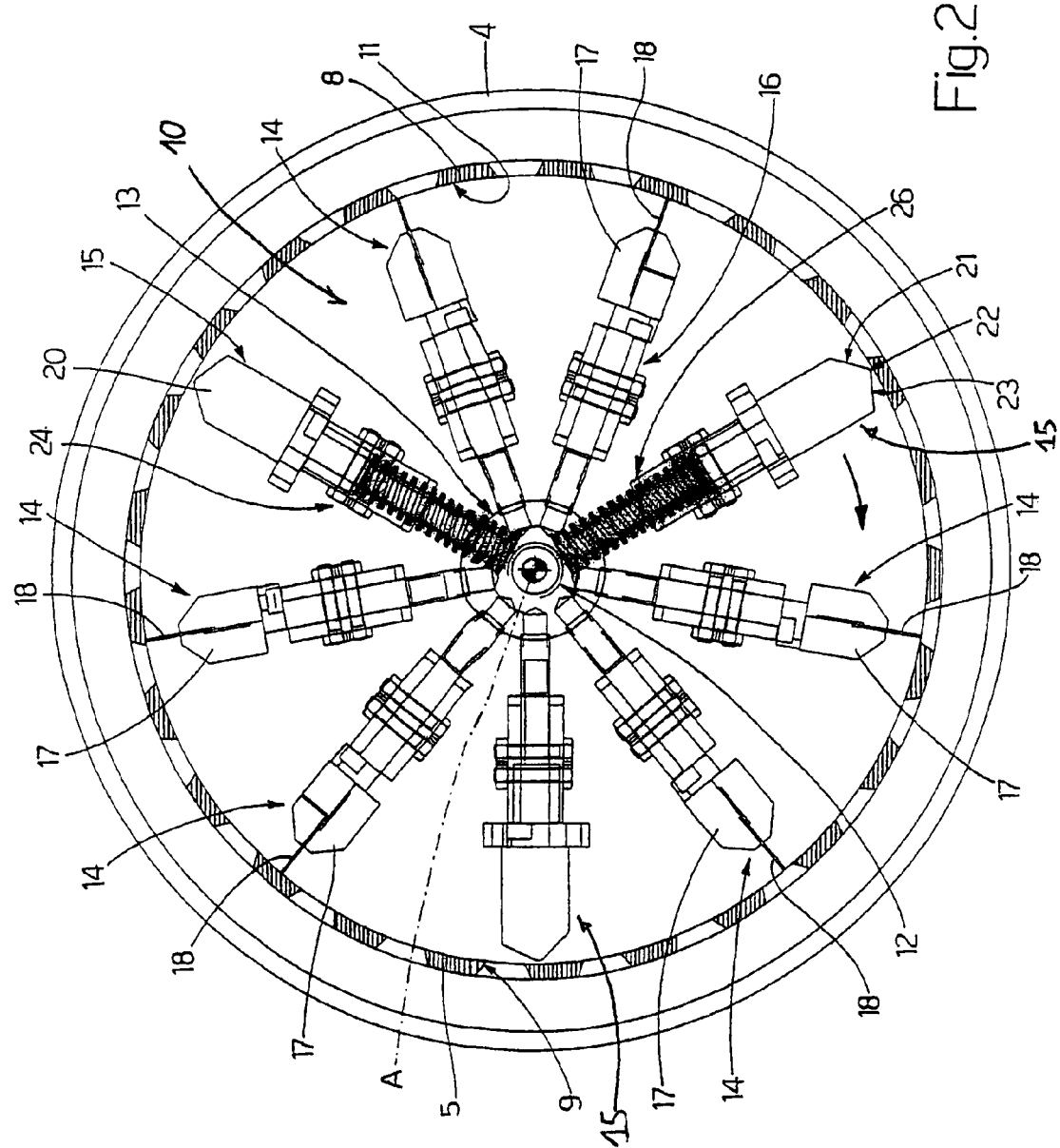
FIG. 2 shows the homogenizer assembly of the machine according to a section I-I of FIG. 1 on an enlarged scale.

Specifically, with reference to FIGS. 1 and 2 the homogenizer assembly 10 is induced to rotate by a drive shaft 12 arranged within the sleeve 5 in a position coaxial to the axis A, and includes a central hub 13 which is stably fitted on the drive shaft 12, a series of paddles or blades 14 connected to the central hub 13 and adapted to scrape the material and the granules adhering to the surface 11, so as to induce the granules to impact against the portion of sharp edge of the apertures 9; and a plurality of stretching tools 15, which are also connected to the central hub 13 in order to perform the crushing and therefore the stretching of the granules on the surface 11.

More in detail, each blade 14 is connected to the central hub 13 through a mechanical connection member 16, which is configured so as to allow the displacement of the blade 14 on a radial plane passing through axis A, from and towards the sleeve 5. In the example shown in FIG. 2, the blades 14 are angularly spaced one from the other around the axis A and each includes a bar 17 extending parallel to the axis A in a position facing the inner surface 11, and a longitudinal blade 18, which protrudingly extends from the bar 17 towards the inner surface 11 so as to have its free end adhering to the inner surface 11 itself.

In greater detail, in the example shown, the longitudinal blade 18 is stably fastened on the bar 17 by means of known fastening members, for instance screws, it has a length measured along the axis A equivalent or shorter than the length of the sleeve 5 measured along axis A, it is substantially rectangular, and is adapted in use to be arranged with its longitudinal outer edge in contact with the inner surface 11 so as to scrape the polymer granules and the bituminous material which adheres on the inner surface 11 because of the crushing/stretching operation.

On the other hand, as far as the mechanical connection member 16 is concerned, in the example shown it includes a pair of support arms 19 extending in a substantially radial direction, which has the respective axial ends hinged on the bar 17 and on the central hub 13 respectively, so as to define with the latter a four-bar linkage, which allows to displace the bar 17 on a radial plane passing through the axis A, from and towards the sleeve 5.

As far as the stretching tools 15 are concerned, instead, they are angularly spaced one from the other about the axis A with the blades 14 inserted therebetween, and each includes a bar 20, which extends parallel to the axis A in a position immediately facing the sleeve 5.

With reference in particular to FIG. 2, each bar 20 comprises an outer side edge 21 having a section transversal to the axis A shaped like a polygon so as to compress and stretch during its rotation the polymer granules against the inner surface 11. In greater detail, in the example shown in FIG. 2, the outer side edge 21 has a substantially triangular section transversal to the axis A, in which a vertex 22 is adapted to be arranged in abutment on the inner surface 11, whereas the side 23 of the triangle, which is arranged in front during the rotation of the stretching tool 15, is adapted to capture and compress the polymer granules and the bituminous material on the inner surface 11.

With reference to FIGS. 1 and 2, each bar 20 is connected to the central hub 13 by means of a mechanical connection member 24, which is configured so as to allow the displacement of the stretching tool 15 on a radial plane passing through the axis A, from and towards the sleeve 5.

In the example shown, the mechanical connection member 24 includes a pair of radial support arms 25 which are vertically spaced one from the other and have the respective axial ends hinged to the bar 20 and to the central hub 13 respectively, so as to be arranged reciprocally parallel and coplanar and define a four-bar linkage allowing to displace the bar 20 on a radial plane passing through the axis A itself, from and towards the sleeve 5.

The mechanical connection member 24 further includes a push device 26, which is interposed between the central hub 13 and the bar 20 and is adapted to exert on the bar 20 itself a radial force capable of maintaining the outer side edge 21, and specifically the vertex 22, constantly in abutment on the inner surface 11 so as to perform compression operations on the polymer granules and, at the same time, the ejection of the bituminous blend through the apertures 9.

Specifically, in the example shown the push device 26 includes at least one spring interposed between the bar 20 and the central hub 13. It should be noted that the spring of the push device 26 exerts, on the bar 20, a preset elastic force that may be varied by means of an adjusting member (not shown) provided in the push device 26. It is apparent that the adjustment of the elastic constant of the spring operated through the adjustment member advantageously allows to appropriately vary the compression exerted on the polymer granules and on the bituminous material by the stretching tool 15 as a function of the type of polymer granules used in the blend.

It should also be added that according to a possible embodiment, the push devices 26 may also be employed in the mechanical connection members 16 included in the blades 14 in order to exert a radial force thereon such as to maintain the longitudinal blades 18 resting on the inner surface 11 thus cutting the granules in contact with the through apertures 9 in an especially effective manner.

As far as the through apertures 9 are concerned, they are uniformly distributed on the side wall 8 along one or more round trajectories according to a preset geometrical configuration.

Figure 3:
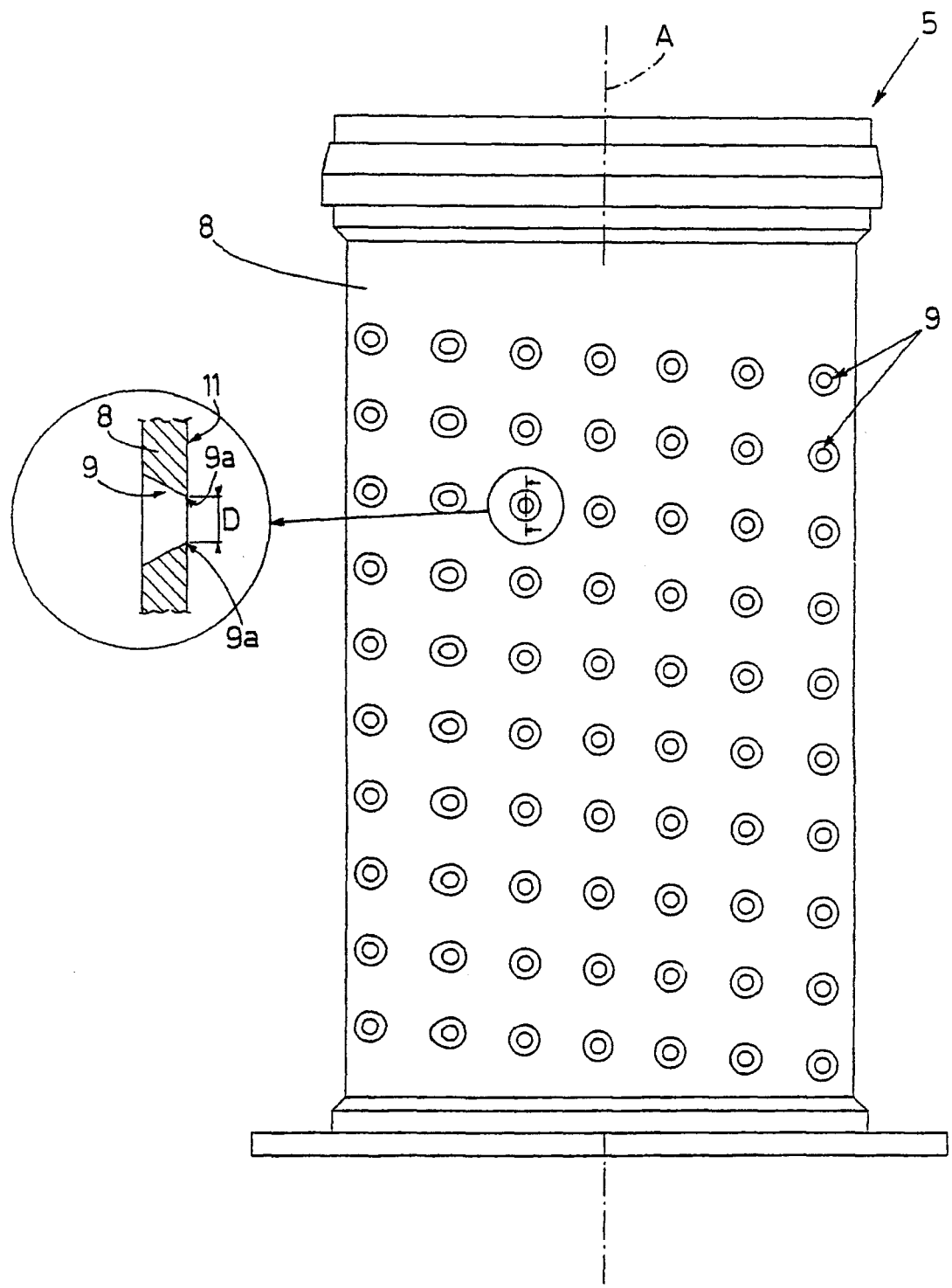
FIG. 3 shows an elevation side view with parts enlarged for clarity of the perforated sleeve of the machine shown in FIG. 1.
Figure 4:
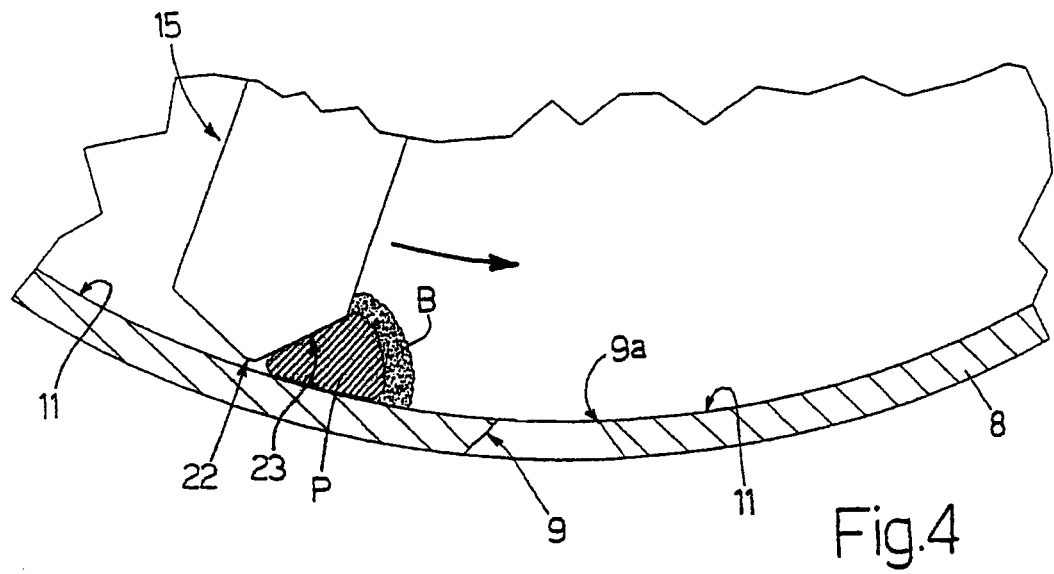
FIGS. 4 to 7 show as many operation steps of the homogenization of the bitumen/granules implemented by the machine shown in FIG. 1.

Specifically, in the example shown in FIG. 3, the through apertures 9 are sequentially obtained on the side wall 8 one following the other from the upper end of the sleeve 5 towards the lower end thereof, according to a substantially spiraled trajectory so as to be positioned at a certain distance one from the other.

In greater detail, the apertures 9 are preferably defined by round holes (also indicated hereinafter by numeral 9), which are distributed on the side wall 8 of the sleeve 5 so as to have the corresponding longitudinal axes arranged on respective lying planes which are orthogonal to the longitudinal axis A and spaced one from the other.

Each hole 9 is flared towards the outer surface of the side wall 8 opposite to the inner surface 11, so as to have the whole inner peripheral edge 9a shaped so as to define a sharp cutting edge capable of cutting the polymer granules. Specifically, the inner peripheral edge 9a of each hole 9 forms a knife having a substantially round shape and has a preset diameter D which results being shorter than the diameter of the outer peripheral edge of the hole 9 itself present on the outer surface of the side wall 8.

In greater detail, with reference to FIG. 3, the holes 9 are shaped so as to each have a substantially frustoconical inner surface diverging outwards from the sleeve 5.

According to a possible embodiment (not shown), the holes 9 are obtained on the side wall 8 so as to have their axes arranged on respective lying planes which are spaced one from the other by a distance substantially equivalent to the diameter D of the peripheral edge 9a of the hole 9.

With reference to FIG. 1, the machine 1 further includes a driving unit provided with an electrical motor 28, which is preferably, though not necessarily, supported by the bearing structure 2 and is connected through connection members with its driving shaft 29 to the drive shaft 12 to rotate the latter about the axis A; and an electronic control unit 30, which is adapted to guide the electrical motor 28 so as to adjust the rotation speed thereof.

In use, the bituminous material and the polymer granules are poured, for instance through conveyor devices (not shown) within the sleeve 5 according to the doses required to obtain the homogenized bituminous blend. Once the above pouring has occurred, the electronic unit 30 controls the operation of the electric motor 28 which rotates the homogenizer assembly 10 about the axis A at a preset speed preferably, though not necessarily, equivalent to about 120 rounds/ minute, and activates the heating circuit, which heats the side wall of the container 4 until the material contained therein and within the sleeve 5 reaches a preset softening temperature, preferably in the range between about 170-180 centigrade degrees.

Figure 5:
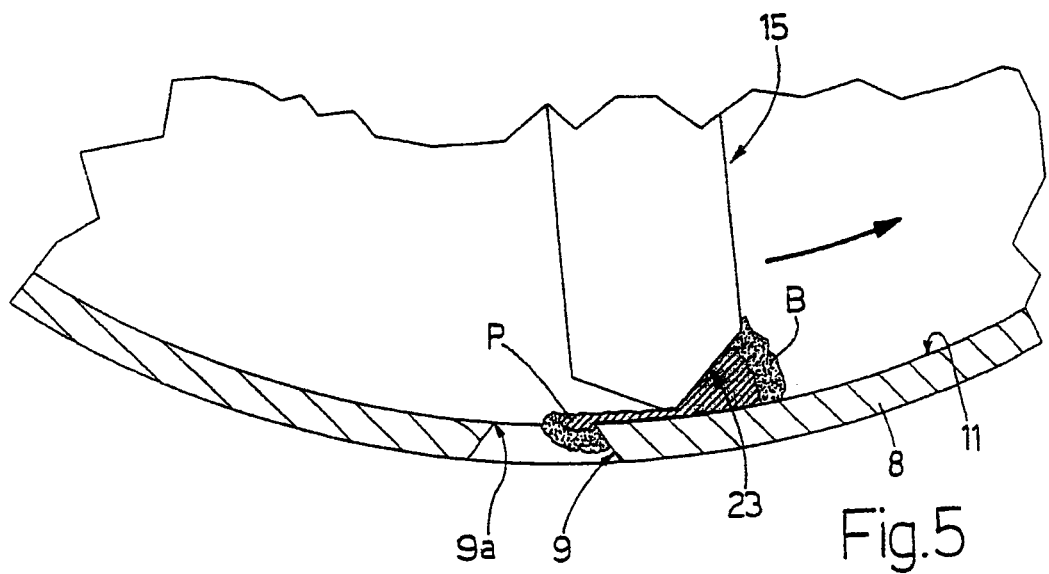
Figure 6:
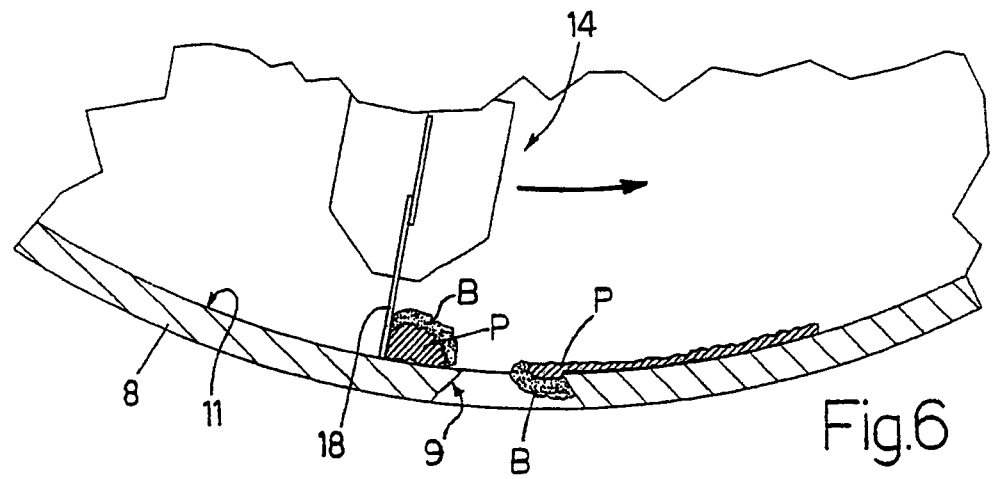
Figure 7:
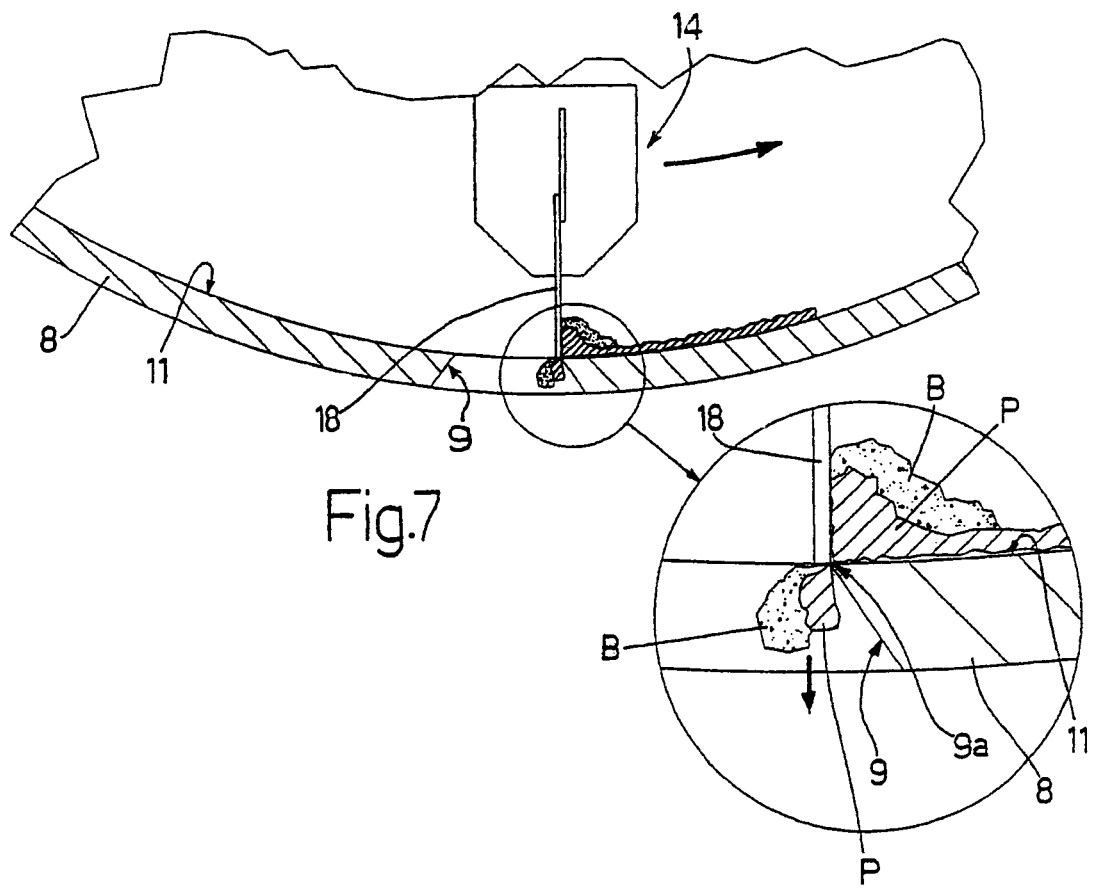

With reference to FIG. 4-7, the rotation of the blades 14 and of the stretching tools 15 determines the radial displacement of the bituminous material, indicated by B, and of the polymer granules, indicated by P, towards the inner surface 11 thus causing the mixing thereof. The homogenization of the bituminous material and of the polymer granules P occurs through the following steps: during its rotation, each stretching tool 15 progressively accumulates some polymer granules P mixed with the bituminous material with its outer edge 21 (FIG. 4), the polymer granules being introduced in the space between the front oblique side 23 of the stretching tool 15 and the inner surface 11 and thus being subjected to a crushing process which progressively reduces the thickness thereof. In other terms, the polymer granules P are progressively crushed and stretched by the stretching tool 15 against the side wall 8, until a determined thickness is achieved (FIG. 5).

In greater detail, during this step the polymer granules P, which are crushed by the stretching tool 15 at the holes 9, have a corresponding portion aligned with the hole 9 itself (FIG. 5) within the sleeve 5.

While the above mentioned stretching of the polymer granules P occurs by means of the stretching tools 15, each blade 14, during its rotation, scrapes the inner surface 11 thereby inducing the polymer granules, and specifically the polymer granule portions which are stretched at the hole 9, to impact against the sharp edge 9a of the apertures 9, thus obtaining the cut of the polymer granules.

Specifically, by brushing the sharp edge 9 each blade 14 cuts the portion of the stretched polymer granule which is at the hole 9 thus causing the ejection from the hole 9 itself at the same time.

In this case, during its rotation, both the blades 14 and the stretching tools 15 radially push certain amounts of granule-bitumen blend within the through apertures 9, which therefore convey the bituminous blend towards the outer container 4. In this manner the blend is therefore progressively ejected from the sleeve 5 and is deposited within the container 4 where it is subjected to a further softening adapted to complete the dissolution of the shredded polymer granule in the homogenized bituminous blend.

The above described machine has several advantages: first of all, it is extremely simple to implement and does not require high electrical power for its operation. As a matter a fact, a minimum power electric motor may be used in virtue of the very low rotation speed of the homogenizer assembly. Laboratory tests have indeed shown that an electric motor sized for an electric power of about 11 kW may ensure an excellent homogenization of the blend, with obvious advantages as far as the saving of energy is concerned.

Furthermore, the temperature of the material and of the polymer granules remains substantially constant, i.e. equivalent to the softening temperature of the heating circuit 6 in virtue of the low rotation speed of the homogenizer group, thus maintaining the chemical-physical characteristics of the polymer granules unaltered.

Finally, the special configuration of the apertures flared towards the outer surface of the side wall of the sleeve avoids any possibility of the machine getting clogged, and thus ensures an excellent ejection of the blend from the sleeve 5 itself.

It is finally apparent that modifications and variants may be made to the machine and to the method described and shown herein without therefore departing from the scope of the present invention.

What is claimed is:

1. A machine (1) for homogenizing a bitumen-based mixture with polymer granules in order to obtain a homogenized bituminous blend;
said machine (1) comprising:
a substantially cylindrical sleeve (5), said sleeve (5) having its longitudinal axis substantially coaxial to a reference axis (A), said sleeve (5) being adapted to internally contain said bitumen-based mixture and a preset amount of said polymer granules; said sleeve (5) having a perforated side wall (8), said perforated side wall (8) comprising a plurality of apertures (9) extending through said perforated side wall (8), each of said plurality of apertures (9) being shaped so as to have at least one sharp cutting edge (9a) portion;
and a homogenizer assembly (10) comprising:
a central hub (13) within said sleeve (5), said central hub being adapted to rotate about said reference axis (A);
at least one knife (14) adapted to rotate within said sleeve (5) to rotate about said reference axis (A), said at least one knife (14) being adapted to displace, during its rotation, at least part of said bitumen-based mixture and of said polymer granules along a direction substantially tangential to the inner surface (11) of said perforated side wall (8) so as to press the polymer granules to impact on the portions of sharp cutting edge (9a) of said plurality of apertures (9); said at least one knife (14) comprising a blade (18) extending parallel to said reference axis (A) and being adapted to abut said inner surface (11) of said perforated side wall (8); each said at least one knife (14) comprising a first bar (17), said first bar (17) being connected to said blade (18), wherein said first bar (17) being adapted to support said blade (18); and
a mechanical connection member (24) linking each said first bar (17) and said central hub (13), wherein said mechanical connection member (24) being adapted to move said first bar (17) along a first plane passing said reference axis (A) to and from said cylindrical sleeve (5).

2. A machine according to claim 1, wherein said homogenizer assembly (10) being adapted to press, during its rotation, said polymer granules on said inner surface (11) of the sleeve (5).

3. A machine according to claim 2, wherein said homogenizer assembly (10) comprising at least one tool (15) being adapted to rotate about said reference axis (A), wherein said at least one tool (15) being adapted to compress said polymer granules on said inner surface (11) of said perforated side wall (8).

4. A machine according to claim 1, wherein said plurality of apertures (9) comprising substantially round holes.

5. A machine according to claim 4, wherein each of said holes (9) comprising a sharp cutting edge (9a), said sharp cutting edge (9a) being continuous along an edge thereof.

6. A machine according to claim 5, wherein each of said holes (9) is flared towards the outer surface of said perforated side wall (8).

7. A machine according to claim 5, wherein said sharp cutting edge portion (9a) or said continuous sharp cutting edge (9a) of each of said plurality of aperture (9) is on the inner surface (11) of said perforated side wall (8).

8. A machine according to claim 4, wherein said holes (9) are spaced one from the other by a distance substantially equivalent to a diameter (D) of said sharp cutting edge (9a) of each of said plurality of aperture (9).

9. A machine according to claim 1, wherein said plurality of apertures (9) are on the perforated side wall (8) one following the other according to a substantially spiral trajectory.

10. A machine according to claim 1, wherein said plurality of apertures (9) are distributed on the perforated side wall (8) of the sleeve (5), each of said plurality of apertures (9) having an axis through a center of said plurality of apertures (9), wherein the axis lies in a third plane, said third plane being orthogonal to said reference axis (A).

11. A machine according to claim 1, wherein said homogenizer assembly (10) comprising at least one tool (15) adapted to compress said polymer granules on said inner surface (11) of said perforated side wall (8), wherein each said at least one tool (15) comprising a second bar (20) having a substantially triangular cross section; said second bar (20) being connected to said central hub (13) by means of said mechanical connection member (24) connecting said second bar (20) and said hub (13) to move said second bar (20) along a second plane passing through said reference axis (A) from and to said cylindrical sleeve (5).

12. A machine according to claim 1, wherein said mechanical connection member (24) comprising an elastic push device (26) connecting said first and second bars (17, 20) and said hub (13), said mechanical connection member being adapted to push said first and second bars (17, 20) to and from said inner surface (11) of said perforated side wall (8).

13. A machine according to claim 1, comprising a plurality of said at least one knife (14) angularly spaced about said reference axis (A).

14. A machine according to claim 13, further comprising plurality of tools (15) angularly spaced around said reference axis (A), each of said plurality of tools (15) being positioned between two knives.

15. A machine (1) for homogenizing a bitumen-based mixture with polymer granules in order to obtain a homogenized bituminous blend;
said machine (1) comprising:
a substantially cylindrical sleeve (5), said sleeve (5) having its longitudinal axis substantially coaxial to a reference axis (A), said sleeve (5) being adapted to internally contain said bitumen-based mixture and a preset amount of said polymer granules; said sleeve (5) having a perforated side wall (8), said perforated side wall (8) comprising a plurality of apertures (9) extending through said perforated side wall (8), each of said plurality of apertures (9) being shaped so as to have at least one sharp cutting edge (9a) portion;
and a homogenizer assembly (10) comprising:
a central hub (13) within said sleeve (5), said central hub being adapted to rotate about said reference axis (A);
at least one knife (14) adapted to rotate within said sleeve (5) to rotate about said reference axis (A), said at least one knife (14) being adapted to displace, during its rotation, at least part of said bitumen-based mixture and of said polymer granules along a direction substantially tangential to said inner surface (11) of said perforated side wall (8) so as to press said polymer granules to impact on said portions of sharp cutting edge (9a) of said plurality of apertures (9); said at least one knife (18) comprising a blade (18) extending parallel to said reference axis (A) and being adapted to abut said inner surface (11) of said perforated side wall (8); and at least one tool (15) adapted to compress said polymer granules on said inner surface (11) of said perforated side wall (8), wherein said at least one tool (15) comprising a second bar (20) having a substantially triangular cross section; said second bar (20) being connected to said central hub (13) by means of said mechanical connection member (24), said mechanical connection member (24) linking each said second bar (20) and said hub (13) and being adapted to move said second bar (20) along a first plane passing through said reference axis (A) from and to said cylindrical sleeve (5).

16. A machine (1) for homogenizing a bitumen-based mixture with polymer granules in order to obtain a homogenized bituminous blend;

said machine (1) comprising:

a substantially cylindrical sleeve (5), said sleeve (5) having its longitudinal axis substantially coaxial to a reference axis (A), said sleeve (5) being adapted to internally contain said bitumen-based mixture and a preset amount of said polymer granules; said sleeve (5) having a perforated side wall (8), said perforated side wall (8) comprising a plurality of apertures (9) extending through said perforated side wall (8), each of said plurality of apertures (9) being shaped so as to have at least one sharp cutting edge (9a) portion;

and a homogenizer assembly (10) comprising:

a central hub (13) within said sleeve (5), said central hub being adapted to rotate about said reference axis (A); and at least one knife (14) adapted to rotate within said sleeve (5) to rotate about said reference axis (A), said at least one knife (14) being adapted to displace, during its rotation, at least part of said bitumen-based mixture and of said polymer granules along a direction substantially tangential to said inner surface (11) of said perforated side wall (8) so as to press said polymer granules to impact on said portions of sharp cutting edge (9a) of said plurality of apertures (9); said at least one knife (14) comprising a blade (18) extending parallel to said reference axis (A) and being adapted to abut said inner surface (11) of said perforated side wall (8); said at least one knife (14) being linked to said central hub (13) and being adapted to move said knife (14) along a first plane passing said reference axis (A) from and to said cylindrical sleeve (5).

* * * * *